G. A. SCHEEFFER.
ELECTRICITY METER.
APPLICATION FILED SEPT. 28, 1910.

1,137,027.

Patented Apr. 27, 1915.
3 SHEETS—SHEET 3.

Witnesses:
Leonard W. Nogauder
George C. Higham

Inventor
Gustave A. Scheeffer
By Bourne Williams
Attorneys

UNITED STATES PATENT OFFICE.

GUSTAVE A. SCHEEFFER, OF INDIANAPOLIS, INDIANA, ASSIGNOR, BY MESNE ASSIGNMENTS, TO ROLLER SMITH CO., OF NEW YORK, N. Y., A CORPORATION OF NEW YORK.

ELECTRICITY-METER.

1,137,027. Specification of Letters Patent. Patented Apr. 27, 1915.

Application filed September 28, 1910. Serial No. 584,173.

*To all whom it may concern:*

Be it known that I, GUSTAVE A. SCHEEFFER, a citizen of the United States, residing at Indianapolis, in the county of Marion and State of Indiana, have invented a certain new and Improved Electricity-Meter, of which the following is a full, clear, concise, and exact description, reference being had to the accompanying drawings, forming a part of this specification.

My invention relates to an improved form of electricity meter, characterized by an armature rotatably mounted and provided with a plurality of windings having independent magnetic cores adapted to be brought into inductive relation with suitable field coils to rotate the armature. The cores referred to extend in planes perpendicular to the axis of rotation of the armature and the field coils are so disposed that the ends of the cores enter such coils during their rotation. Two field coils are provided in connection with each end of the magnetic cores, these field coils being so displaced that they overlap each other so that the armature cores have exerted upon them a continuous rotative tendency between points of commutation. The field coils and armature windings are further so related that, if subjected for any reason to the action of external magnetic fields, the strength of one set of poles of the magnetic cores is increased, and the other set of poles of such cores is corespondingly decreased, thus maintaining a constant rotative effort between the armature and the field coils for any given condition of current flow through the meter windings. The meter may therefore be said to be astatic in its operation.

Figure 1:
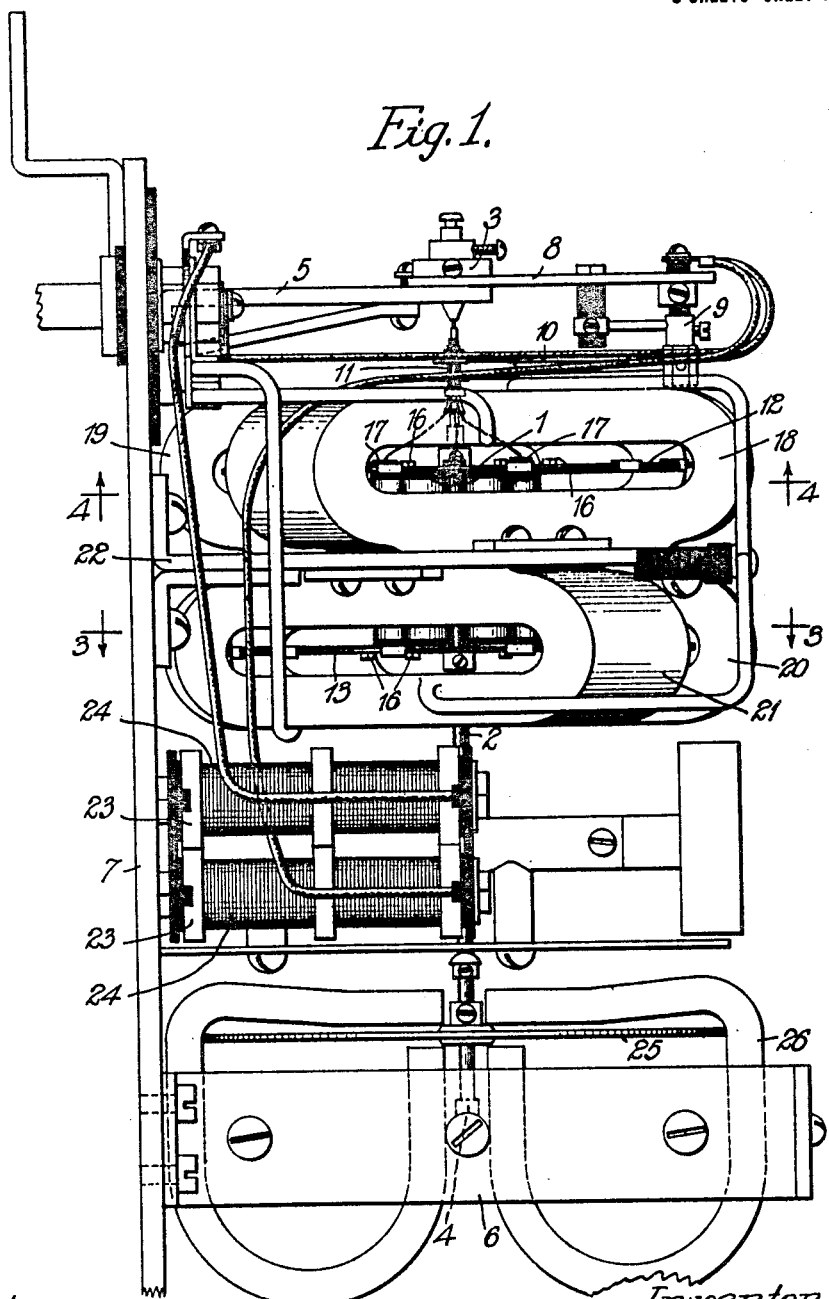
Figure 2:
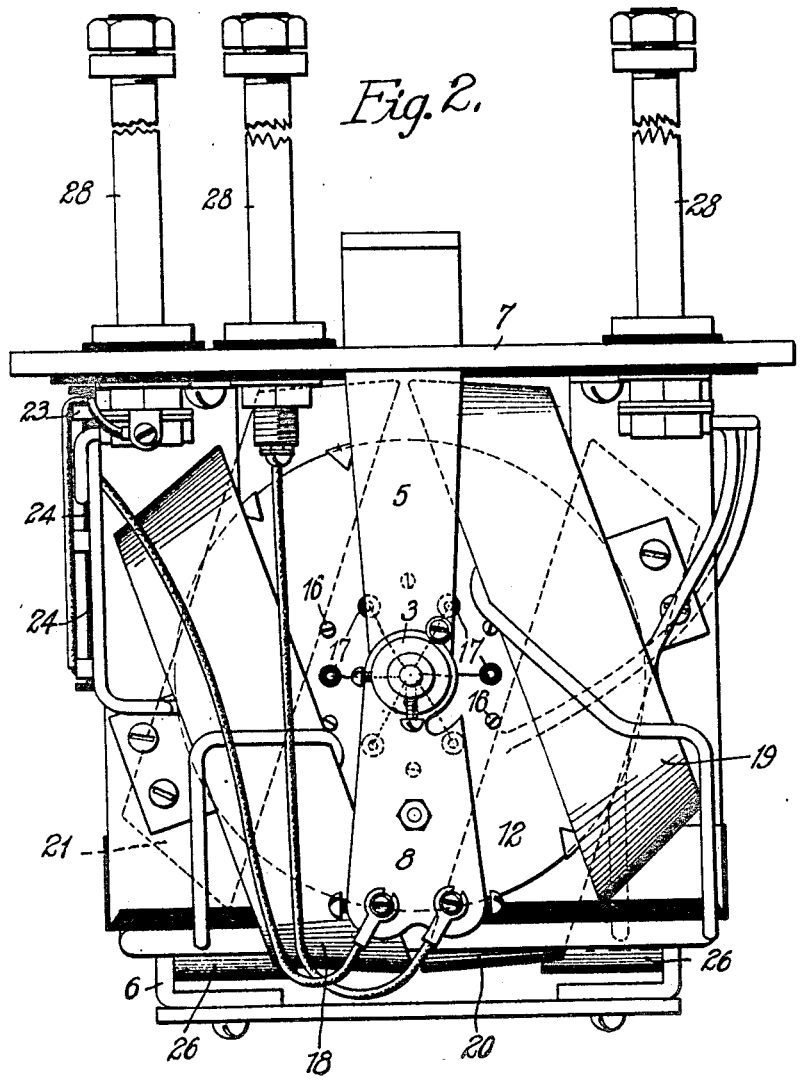
Figure 3:
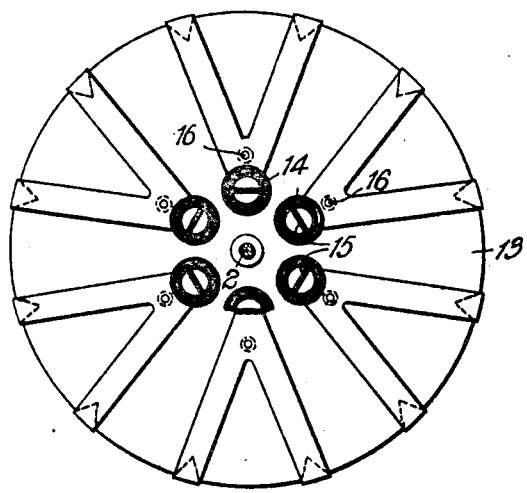
Figure 4:
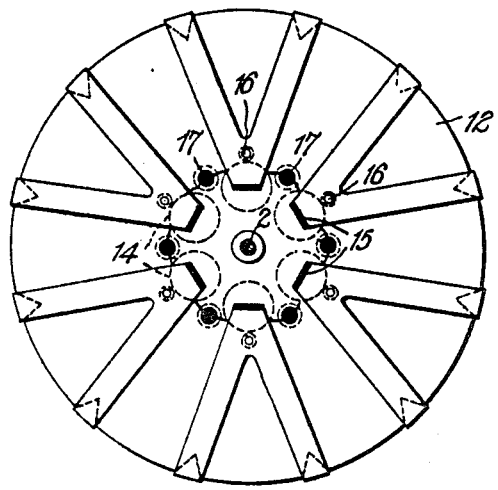

The several drawings illustrating my invention are as follows:

Figure 1 is a side view of the complete meter structure. Fig. 2 is a top view of the parts shown in Fig. 1. Fig. 3 is a view of the armature taken along the line 3—3 in Fig. 1. Fig. 4 is a view of the armature taken along the line 4—4 in Fig. 1.

Similar numerals refer to similar parts throughout the several views.

As shown in Figs. 1 and 2, the armature 1 is mounted upon a shaft 2 supported in bearings 3 and 4 by brackets 5 and 6 respectively from the base 7. The bracket 5 has supported therefrom, concentrically with the bearing 3, a rocker arm 8 which carries the brush holders 9, by which in turn the brushes 10 are supported in proper position relatively to the commutator 11 mounted upon the shaft 2 and connected with the armature windings as indicated.

As shown in Figs. 3 and 4 the armature consists essentially of two disks 12 and 13 carried by the shaft 2 between which are mounted the armature windings 14. The windings 14 are provided with independent magnetic cores 15 extending through such windings and the ends of these cores are split as indicated in Figs. 3 and 4 and bent out radially away from the shaft 2 in planes substantially at right angles to such shaft, the outwardly extending ends being secured to the disks 12 and 13 by means of screws or rivets 16. The ends of the divergent magnetic paths are bent around the edges of the disks 12 and 13 to secure them more firmly to such disks. As indicated in Fig. 4, the terminals of the windings 14 extend through bushings 17 in the disk 12 and thus to the segments of the commutator 11. The disks 12 and 13 are of nonmagnetic material and preferably of metal, as aluminum.

The armature construction just described is not claimed herein as it forms a part of my invention disclosed in my copending application, Serial No. 538,029, filed January 14, 1910.

The field coils 18, 19, 20 and 21 are supported by the bracket 22 from the base 7 in such a manner that the coils 18 and 19 are disposed upon opposite sides of the shaft 2 and each spans a portion of the disk 12, as a result of which the ends of the armature cores carried by such disk pass into and out of such field coils as the armature rotates. The field coils 20 and 21 are similarly disposed relatively to the disk 13 but are placed at such an angle to the coils 18 and 19, as shown in Fig. 2, that as the magnetic armature poles of one sign are leaving the position of greatest effective rotative effort, for example in coil 18, the other ends of these cores, which are oppositely magnetized, are brought into a position relatively to the field coil 21 so that a rotative effort in the same direction is produced upon the armature by the field coil 21 which continues nearly to the point of commutation. In other words, the magnetic poles produced by the armature windings, as they move from one point of commutation to the other, are subjected to rotative effort in the same direction which is practically continuous and extends over the greater portion of the arc between the points of commutation. In the construction shown in the drawings the direction of current flow through the armature windings is changed by the commutator as the windings pass a vertical plane through the shaft 2 which is substantially parallel to the base 7. The field coils 19 and 20 coöperate with the windings on the other side of the armature in a manner similar to that described above for the field coils 18 and 21. Due to the particular winding on the armature which I employ, the line of greatest magnetic moment is at right angles to the line of contact of the brushes on the commutator. This is different from the well known Gramme or drum winding of a ring or drum armature. Considering one armature disk as divided by the line joining the point of contact of the brush, the pole pieces on one side of the line are of north polarity, while the pole pieces on the other side of the line are of south polarity. It is thus readily seen that the line of greatest magnetic moment of the armature is substantially at right angles to the line of greatest magnetic moment of the field, as is well known and common in direct current motor practice.

The base 7 has mounted thereon upon suitable spools 23, resistances 24 which are connected in series with the armature windings so that the circuit thus formed may be connected across the mains of the supply circuit being measured and thus constituting the pressure circuit of the meter. The field coils are preferably connected in series and in circuit with the load current or a shunted portion thereof, according to the amount of the load, such field coils being connected so as to produce the rotative results indicated above. It will, of course, be understood that any manner of connecting the field coils may be employed which will produce the desired results under any given set of conditions without departing from the spirit of my invention.

The shaft 2 carries near its lower end a metallic disk 25 of nonmagnetic material which is spanned by the retarding magnets 26 supported by the bracket 6 from the base 7. As indicated in the drawings a pair of retarding magnets is used on each side of the armature shaft in order to exert the requisite amount of retarding force upon the armature. This is necessary since the field coil construction above described is very efficient and the torque produced upon the armature is correspondingly large.

The base 7 has extending rearwardly therefrom a plurality of insulated bolts 28 for securing the meter to a switchboard or mounting panel and these posts are also employed as terminals for the meter windings.

While I have shown my invention in the particular embodiment herein described, I do not, however, desire to limit myself to this construction but desire to claim any equivalent that may suggest itself to those skilled in the art.

What I claim is:

1. In an electric meter the combination of a rotatable armature having a plurality of independent windings, independent cores for said windings, each of said cores having a pole piece, said pole pieces lying in the same plane, and a common field coil adapted to surround the pole pieces of said cores as the armature rotates.

2. In an electric meter, the combination of a rotatable armature having a plurality of windings, an independent core for each winding extending longitudinally of the armature, and two field coils surrounding opposite poles of such cores.

3. In an electric meter, the combination of a rotatable armature having a plurality of windings, an independent core for each winding, and two field coils on each side of the armature, the coils on one side surrounding opposite poles of the same armature winding cores and the coils on the other side of the armature surrounding opposite poles of oppositely magnetized armature winding cores.

4. In an electric meter, the combination of a rotatable armature having a plurality of windings, an independent core for each winding, and two field coils on each side of the armature, the coils on one side surrounding opposite poles of the same armature winding cores and the coils on the other side of the armature surrounding opposite poles of oppositely magnetized armature winding cores, the coils on each side of the armature being angularly displaced and exerting a continuous rotative effort on the corresponding poles.

5. In an electric meter, the combination of a rotatable armature having a plurality of windings, an independent core for each winding, and two field coils on the same side of the armature surrounding opposite poles of the same armature winding cores, such coils being angularly displaced and exerting a continuous rotative effort on such poles.

6. In an electric meter, the combination of a rotatable armature having a plurality of concentrated windings, an independent salient pole core for each winding, and two independent field coils disposed on the same side of the armature so that their rotative effects upon the magnetic armature poles overlap.

7. In an electric meter, the combination of a rotatable armature having a plurality of windings, an independent salient pole core for each winding, and two independent field coils on each side of the armature, the field coils being positioned so that their rotative effects upon the magnetic armature poles overlap.

8. In an electric meter, the combination of rotatable armature windings each having an independent magnetic core provided with outwardly extending radial ends, and a field coil disposed around the path of each set of ends on each side of the armature.

9. In an electric meter, the combination of rotatable armature windings each having a magnetic core provided with outwardly extending radial ends, and two flat field coils on the same side of the armature disposed so that similar ends of such cores pass into and out of one of the coils as the armature rotates while the other ends of the cores similarly pass into and out of the other coil.

10. In an electric meter, the combination of rotatable armature windings each having a magnetic core provided with outwardly extending radial ends, and two flat field coils on the same side of the armature disposed so that similar ends of such cores pass into and out of one of the coils as the armature rotates while the other ends of the cores similarly pass into and out of the other coil, such field coils located so their rotative effect upon the magnetic armature poles overlap.

11. In an electric meter, the combination of rotatable armature windings each having a magnetic core provided with outwardly extending radial ends, and two flat field coils on each side of the armature, the coils on one side being disposed so that similar ends of such cores pass into and out of one of the coils as the armature rotates while the other ends of the cores similarly pass into and out of the other coil, such field coils being located so their rotative effect upon the magnetic armature poles overlap, and the field coils on the other side of the armature being similarly disposed relatively to oppositely magnetized armature core ends.

12. In combination, an open solenoid field coil, a shaft, a disk-shaped rotatable armature, said coil embracing a segment of said disk-shaped armature, said armature comprising a plurality of cores parallel with said shaft said cores having substantially radially projecting iron pole pieces, independent armature windings on said cores for producing salient poles, and a commutator to provide for energizing said armature windings to cause rotation of the armature.

13. In combination an air core field coil, a rotatable armature, said field coil embracing a segment of said armature, said armature comprising a plurality of independent iron cores having substantially radially projecting iron pole pieces on each end thereof, said cores having independent armature windings thereupon, and a commutator to provide for energizing said armature windings to cause and maintain rotation of the armature.

14. In combination, a field coil, a rotatable armature having a shaft, said armature comprising a plurality of U-shaped iron cores having the bottoms of the U substantially parallel with the shaft and having the limbs of the U projecting radially outwardly, armature coils on said U-shaped cores, and a commutator to provide for energizing said cores in turn to produce rotation, said field coil embracing the end of at least one of said cores at all times.

15. In combination, a pair of field coils placed side by side, a rotatable armature having a shaft located on one side of said field coils, said armature comprising a plurality of U-shaped iron cores having windings thereupon and having the limbs of the U-shaped cores projecting into said field coils, and a commutator to provide for energizing said armature cores in turn to produce rotation.

16. In combination, a rotatable armature having a shaft, a pair of field coils arranged side by side on one side of said shaft, said armature comprising a plurality of U-shaped iron cores having armature windings thereupon and having the ends thereof projecting into said field coils, and a commutator to provide for energizing said armature cores to produce rotation.

17. In combination, a field coil, a rotatable armature having a shaft, said armature comprising a plurality of radially-projecting pole pieces, said pole pieces having their ends projecting into said field coil, armature windings on said pole pieces, said windings being disposed at right angles to said projecting pole pieces, and a commutator to provide for energizing said coils in turn to produce rotation of the armature.

18. In an electric meter the combination of a rotatable armature having a plurality of independent windings, an independent core for each winding, a pole piece for each core, said pole pieces lying in a common plane, each core having a salient pole produced therein and a common open field coil surrounding said pole pieces of such cores as the armature rotates.

19. In combination a rotatable armature having a shaft, an open field coil on one side of said shaft, said aramature comprising a plurality of radially projecting pole pieces, said pole pieces projecting into said field coil, cores parallel to said shaft, said cores being connected to said pole pieces, separate windings on each core and means to provide for energizing said armature cores to produce rotation.

20. In combination an open field coil, a rotatable armature having a shaft, said armature comprising a disk embraced by said field coil, and a plurality of pole pieces projecting substantially radially from said shaft, cores parallel to said shaft, said pole pieces being connected to said cores, independent windings for said cores and sliding contact means for supplying current to said windings to produce rotation of said armature.

In witness whereof, I hereunto subscribe my name this 20th day of September, A. D. 1910.

GUSTAVE A. SCHEEFFER.

Witnesses:
ELMER E. SCOTT,
HULDAH RIMPLER.

Copies of this patent may be obtained for five cents each, by addressing the "Commissioner of Patents. Washington, D. C."